United States Patent [19]

Kamman et al.

[11] 4,438,599
[45] Mar. 27, 1984

[54] VIBRATION DAMPER FOR MACHINE-CARRIED WORKPIECE

[75] Inventors: Joseph T. Kamman; Mark D. Kohring, both of Cincinnati, Ohio

[73] Assignee: Cincinnati Milacron Inc., Cincinnati, Ohio

[21] Appl. No.: 334,964

[22] Filed: Dec. 28, 1981

[51] Int. Cl.³ .............................................. B24B 41/06
[52] U.S. Cl. .................................................... 51/238 S
[58] Field of Search .............. 269/310, 275; 51/238 S, 51/216 R

[56] References Cited

U.S. PATENT DOCUMENTS

| | | | |
|---|---|---|---|
| 671,448 | 4/1901 | Morton | 51/238 S |
| 1,736,167 | 11/1929 | Norton | 51/238 S |
| 2,519,107 | 8/1950 | Brown | 269/275 |
| 2,638,719 | 5/1953 | Balsiger | 51/238 S |
| 3,330,074 | 7/1967 | Stuckey | 51/238 S |
| 3,839,830 | 10/1974 | Bair | 51/238 S |
| 4,074,470 | 2/1978 | Lore | 51/238 S |

Primary Examiner—Harold D. Whitehead
Attorney, Agent, or Firm—Thomas M. Farrell

[57] ABSTRACT

A work contact shoe floats in an elastomeric mount within a shoe holder, and the shoe holder is mounted by bracket means to a machine base. A preload mechanism is employed for forcing the work contact shoe into a slight preload against a workpiece so that as the workpiece is machined and vibrations are generated, the vibrations will be attenuated by shearing of the elastomer.

2 Claims, 6 Drawing Figures

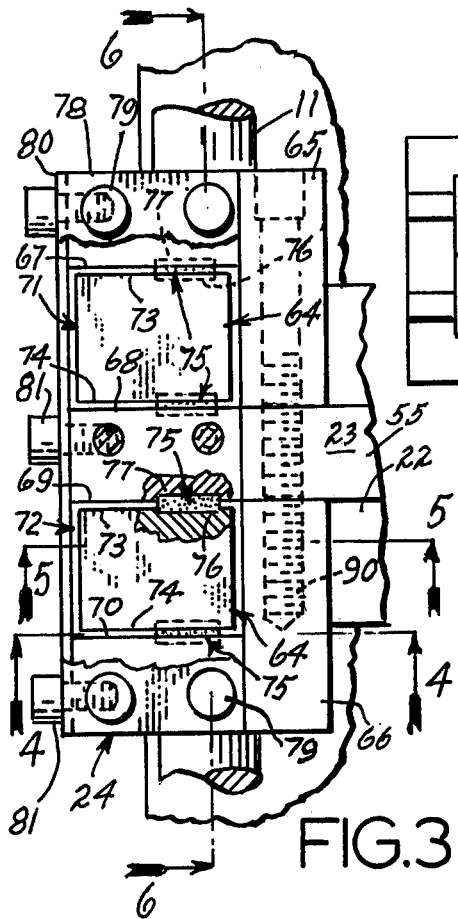
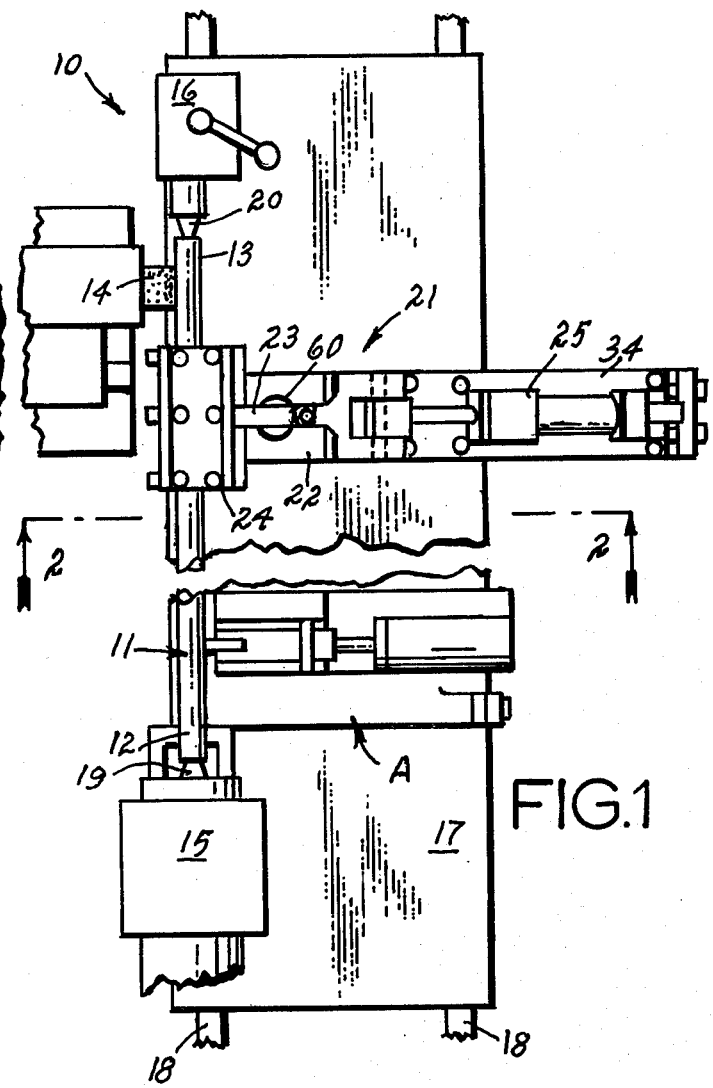
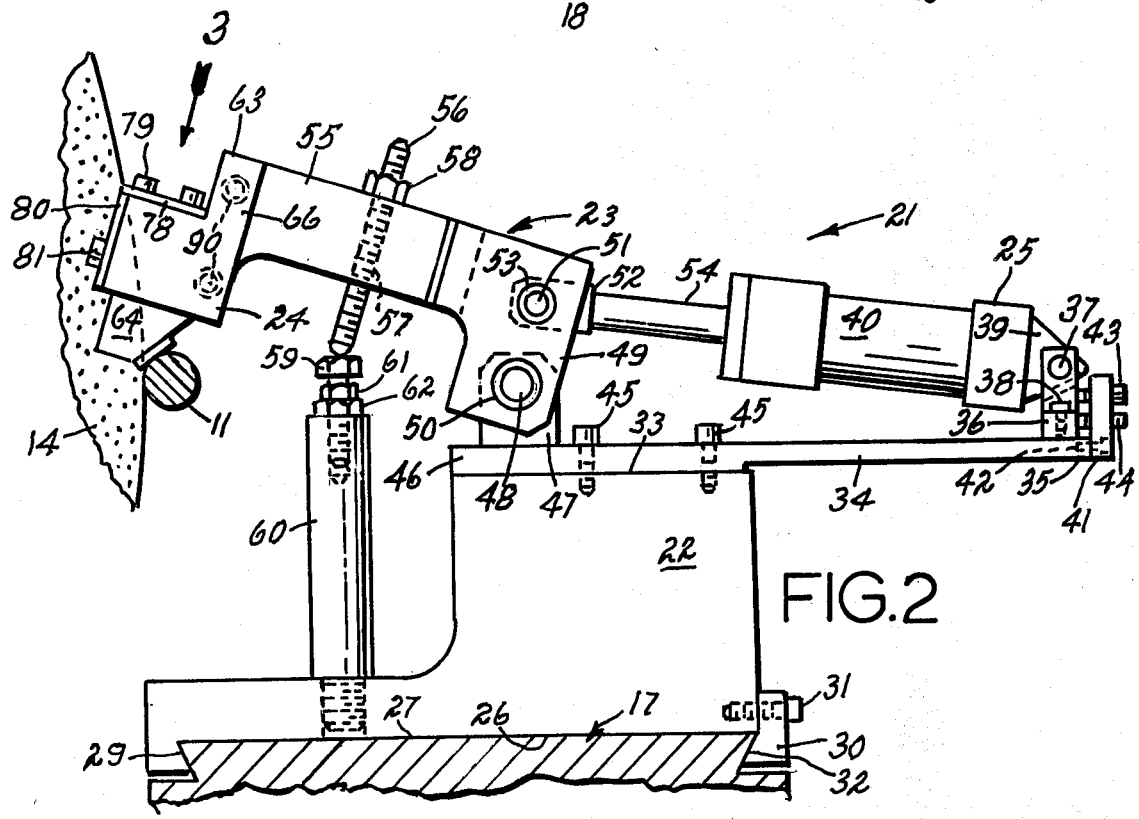

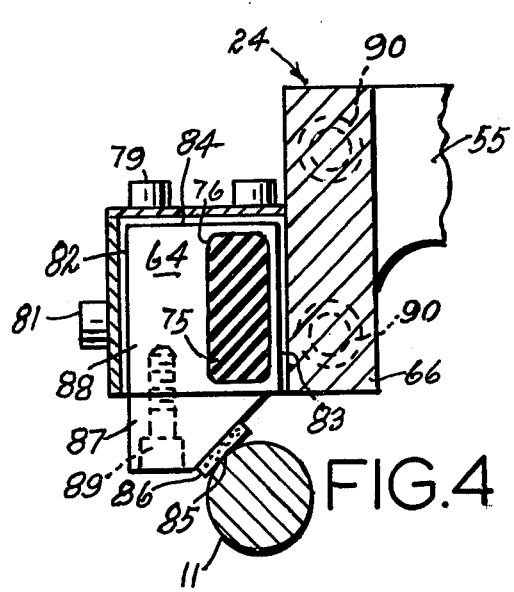
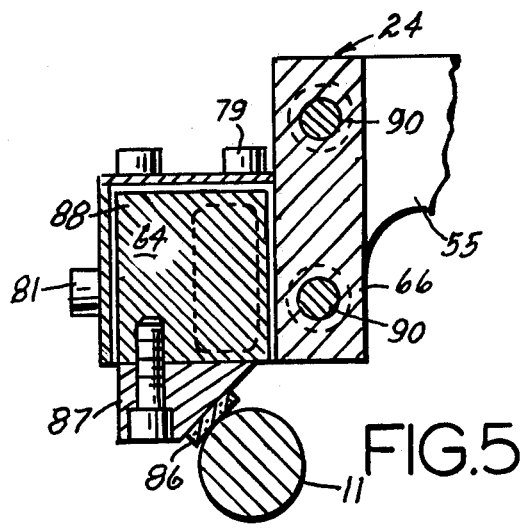
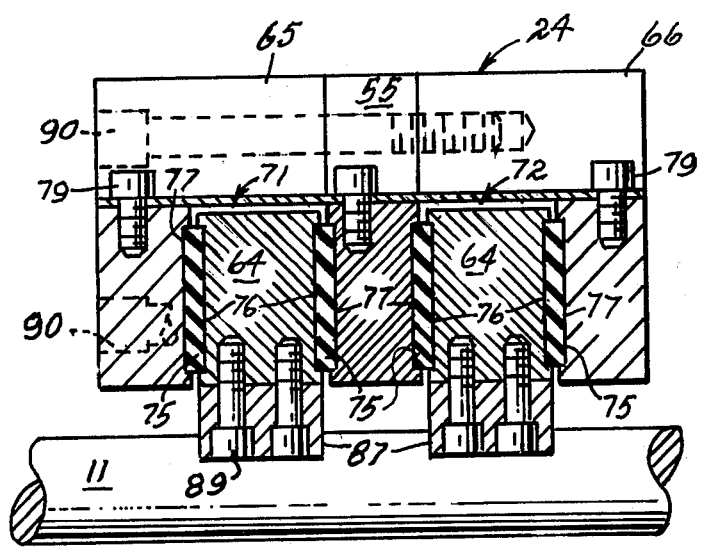

VIBRATION DAMPER FOR MACHINE-CARRIED WORKPIECE

BACKGROUND OF THE INVENTION

The invention primarily addresses itself to the solution of controlling induced vibrations in a workpiece during a machining operation. Slender workpieces, typically having an LD ratio of 10:1, present problems when it is necessary to machine such parts of rotation when the workpiece is held between end point supports such as machine centers. A simply supported workpiece tends to sag into a curvature at its center span, due to its inherent weight and springiness, and even a backrest-supported workpiece may deflect between supports, so a certain amount of vibrations may be generated just through rotation of the workpiece at certain speeds. However, additional forcing functions may be encountered through the interaction of a cutter, such as a grinding wheel, which may cause additional vibrations to be induced in the workpiece.

In a production operation, it is not feasible to equip each workpiece with an individual vibration damper firmly attached thereto because of the large numbers of dampers which would have to be designed, and the additional time which would be consumed in mounting and dismounting the individual dampers. It is preferable, therefore, to have a universal damper for all workpieces of a given class which may be employed at a work zone either manually for low production runs, or automatically for higher production automatic cycles. Applicant has devised a solution to the problem of machining slender workpieces on a center-type machine through a novel vibration damper mechanism which may be releasably clamped to a machine base, and the damper elements may be applied to a given workpiece with relative ease of operation.

SUMMARY OF THE INVENTION

The invention is shown embodied in a vibration damper for machine carried workpieces, wherein a work contact shoe is supported in a shoe holder by elastomeric mounting means, and the shoe holder is movably carried on a mounting bracket adapted to a machine base. An automatic cylinder means is provided for swinging the shoe into contact with the workpiece under a preload force, and the cylinder is also used for swinging the work contact shoe out of the work zone to facilitate workpiece access.

BRIEF DESCRIPTION OF THE DRAWINGS

FIG. 1 is a plan view of a center-type machine tool employing the vibration damper of the present invention.

FIG. 2 is a side elevational view of the vibration damper of FIG. 1, taken along the line 2—2 of FIG. 1.

FIG. 3 is an enlarged plan view of the work contact portion of FIG. 2, taken in the direction of arrow 3 of FIG. 2.

FIG. 4 is an elevational section through the elastomeric shoe mount of the vibration damper, taken along the line 4—4 of FIG. 3.

FIG. 5 is a side elevational section through the work contact shoe of the vibration damper taken along the line 5—5 of FIG. 3.

FIG. 6 is a front elevational section taken through the vibration damper along the line 6—6 of FIG. 3.

DESCRIPTION OF THE PREFERRED EMBODIMENT

FIG. 1 of the drawings depicts a center-type machine tool 10, adapted for supporting a long slender workpiece 11 of rotation by its extreme ends 12,13 while a machining operation is performed on the workpiece 11. The cutting tool 14, here depicted as a grinding wheel, removes stock from the diameter of the workpiece 11 during the operation, and the workpiece 11 is supported at the extreme ends 12,13, respectively, by a headstock 15 capable of both supporting and driving the workpiece 11, and a footstock 16 which supplies support alone. A backrest "A", such as that shown in U.S. Pat. No. 3,330,074, is also employed to provide support. The headstock 15 and footstock 16 are carried by a machine table 17, which is movable on machine base ways 18 to position the workpiece 11 longitudinally with respect to the cutting tool 14. Due to gravity, the slender workpiece 11 may tend to sag and deflect toward the table 17 between the backrest "A" and the headstock and footstock centers, 19,20. The rotational speed of the workpiece 11 as it is driven, possibly taken alone or together with the forcing function of a powered cutting tool 14, may cause the workpiece 11 to undergo vibrations during the machining cycle. Therefore, a vibration damper 21 is employed, which is of modular design, and the damper 21 is adapted to be releasably clamped to the machine table 17 so that it may be moved to various longitudinal positions with respect to the workpiece 11. In certain circumstances it may be desirable to utilize a plurality of vibration dampers 21 for a given workpiece 11. The damper 21 has a base mounting bracket 22 which carries a damping arm 23 having a damping head 24, and the damping arm 23 is pivotal between work engaging and disengaging positions by a linearly extensible motor 25 such as the hydraulic piston/cylinder set shown.

The elevational view of the FIG. 2, shows that the mounting bracket 22 of the vibration damper 21 has a bottom surface 26 which engages the top 27 of the machine table 17, and a dovetail portion at the front of the bracket 22 hooks over one dovetail side 29 of the table 17, while a separate dovetail clamp 30 is fastened by a screw 31 to the rear of the bracket 22 to engage the other dovetail side 32 of the table 17 and lock the bracket 22 in position. The top 33 of the mounting bracket 22 has a baseplate 34 extending outward toward the machine operator (not shown) and the outboard end 35 of the plate 34 has a clevis bracket 36 and clevis pin 37 secured thereto. The clevis bracket 36 is fastened to the baseplate 34 by screws 38, and serves to support the end 39 of the cylinder 40 in a pivotable manner. The clevis bracket 36 is positioned by an adjusting bracket 41 secured to the outboard end 35 of the baseplate 34 by screws 42, and the bracket 41 serves to push and pull the clevis bracket 36 to a final adjusted position by suitable screws 43,44. The baseplate 34 is secured to the top 33 of the mounting bracket 22 by cap screws 45. The forward end 46 of the baseplate 34 has an integral pivot block 47, having a pivot pin 48 passing horizontally therethrough, and the pivot block 47 is straddled in a clevis manner by the bifurcated rear end 49 of the damping arm 23. Bushings 50 are provided in the damping arm 23 to journal smoothly on the pivot pin 48. A second pivot pin 51 is provided through the upper portion of the damping arm 23, and the pivot pin 51 passes through the piston rod end 52. Bushings 53 are provided in the damping arm 23 about the second pivot pin 51, and the piston rod end 52 is likewise straddled in a clevis arrangement with the damping arm 23. By the clevis arrangement shown, the reverse actuations of the piston rod 54 within the piston cylinder 40, serve to pivot the damping arm 23 from a downward, work engaging, position to an upward work disengaging, position so that the operator may have ease of access with the workpiece 11. The damping arm 23 has a central web portion 55, generally rectangular in cross-section and of greater depth than width, so that the arm 23 will be stiff in the direction of pivot movement. The web portion 55 has an adjusting screw 56 threadably received in a tapped hole 57, and the adjusting screw 56 has a lock nut 58 for securing its position. The adjusting screw 56 comes to rest against a stop screw 59 which is threadably received in a post 60 vertically mounted to the mounting bracket 22, and suitable jam nuts 61,62 are provided on the stop screw 59 to adjust the final position of the pivotable damping arm 23. The forward end 63 of the damping arm 23 supports a floating shoe assembly 64 which contacts the workpiece 11 during the machining operation and the adjusting screw 56 is adjusted to provide a slight preload of the shoe assembly 64 against the workpiece 11.

Referring to FIG. 3, a partial broken-away plan view of the forward end 63 of the damping arm 23 is illustrated, wherein the web portion 55 of the damping arm 23 extends forward, and is straddled by a pair of L-shaped blocks 65,66 which are drawn together to form a unitary trifurcated damping head 24. The interior sidewalls 67,68,69,70 of the trifurcated head 24 form a pair of U-shaped channels 71,72 in which are positioned a pair of identical shoe assemblies 64. However, it may be appreciated that the shoe assemblies could be non-identical to cover different frequencies. The shoe assemblies 64 are dimensioned so that ample clearance will be maintained between the shoe assembly sidewalls 73,74 and the U-channels 71,72. Elastomeric elements 75 are compressibly positioned between the sidewalls of the U channels 71,72 and the shoe assemblies 64. The compressibly loaded elastomeric elements 75 are received in shallow, conforming relief pockets 76,77 which are machined in the parallel side walls of the shoe assemblies 64 and the U channels, 71,72 respectively, A top cover 78 is secured to the trifurcated head 24 by screws 79, and similarly, a front cover 80 is received on the head 24 and held in place by suitable screws 81. The covers 78,80 serve to keep contaminents from the clearance space provided around the shoe assemblies 64, and also to provide additional holding structure for tying the trifurcated head 24 together, and to prevent the shoe assemblies 64 from being twisted out.

FIG. 4 illustrates an elevational section through the trifurcated head 24. The typical elastomeric element 75 is shown as being a generally rectangular sheet, received in a suitably conforming relief pocket 76 machined in the side of the shoe assembly 64. The shape of the element is convenient, and could be varied to suit the designer. The shoe assembly 64 is dimensioned so that an ample clearance space is provided entirely around the front, rear, and top outer walls 82,83,84, of the shoe assembly 64. Here it may be noted that the shoe assembly 64 is considered to be a unitary structure, and it is desired that the mass of the shoe be held to a minimum amount so that only the springiness and damping qualities of the elastomeric element 75 are utilized to form a spring-mass-damper system with the workpiece 11. In actual use, however, for purposes of long life, it is preferable that the work-contacting surface 85 of the shoe assembly 64 be a long-wearing substance. Therefore, the work contacting surface 85 is a strip 86 of tungsten carbide material brazed to a ferrous substructure 87. The ferrous, or steel, substructure 87 is in turn fastened to an aluminum main body 88 of the shoe assembly 64 by cap screws 89.

Fig. 5 better illustrates the shoe assembly 64, showing the carbide strip 86 and substructure 87, and the main body 88 of the shoe assembly which, as stated, is preferred to be of low mass material such as aluminum.

FIG. 6 illustrates a front elevational section through the damping head 24, where the central web portion 55 is shown having the left and right side L-shaped brackets 65,66, secured thereto by suitable screws 90 passing through the members 55,65,66, so that a trifurcated head 24 is formed, establishing the pair of U-shaped channels 71,72 in which are received the shoe assemblies 64. The shoe assemblies 64 are centered between the sidewalls of the channels 71,72 by elastomeric elements 75 which are preloaded and compressibly received in suitable pockets 76,77 in the sidewalls of the shoe assemblies 64 and channels 71,72. Each shoe assembly 64 is thus permitted to float a small amount relative to the trifurcated head 24 under the influence of machine vibrations or part vibrations, and the vibrations will therefore be attenuated by the damping properties of the elastomeric elements 75.

It may be appreciated that the damping arm 23 and head 24 may be applied to the workpiece 11 in other manners than the pivotal arrangement described: for example, the damping arm 23 and head 24 may be slid into work-contacting engagement. Additionally, while the pivotal damping head 24 is shown applied in an automatic manner by the extensible motor 25, it may be appreciated that a rotary motor may be employed or a suitable mechanical element such as a toggle clamp linkage may be utilized so that the damping head 24 may be applied manually. It may further be appreciated that more or less shoe assemblies 64 may be accomodated by a damping head 24, and in addition, a plurality of damping heads 24 may be applied to a given workpiece 11. It may be further appreciated that the shoe assemblies 64 may be applied to a workpiece in directions differing from the overhead system depicted.

It is not intended to limit the invention to the specific embodiment shown herein, but rather, the invention extends to all such designs and modifications that come within the scope of the appended claims.

What is claimed is:

1. A vibration damper for machine-carried workpieces, comprising:
    (a) a work contact shoe;
    (b) a shoe holder;
    (c) a pair of elastomeric elements oppositely disposed between said shoe and said holder, wherein said elements are preloaded in opposition to each other;
    (d) means for mounting said shoe holder to a machine base; and
    (e) means for preloading said shoe against a workpiece in a direction transverse to the preload direction of said opposed elastomeric elements.

2. A vibration damper for machine-carried workpieces of revolution, comprising:
    (a) a work contact shoe;
    (b) a shoe holder having a pair of side walls on opposite sides of said shoe;

(c) a pair of elastomeric elements preloaded in opposition to each other and disposed between respective shoe holder side walls and sides of said shoe so as to position said shoe between said side walls of said holder;

(d) a bracket for mounting said shoe holder to a machine base;

(e) a pivot joint for pivotally supporting said shoe holder on said bracket;

(f) a linearly-extensible motor, connected at opposite ends to said holder and said bracket, respectively at points away from said pivot joint; and (g) end stop means for adjusting preload of said shoe against a workpiece in a direction transverse to the preload direction of said opposed elastomeric elements.

* * * * *